Figure 3:
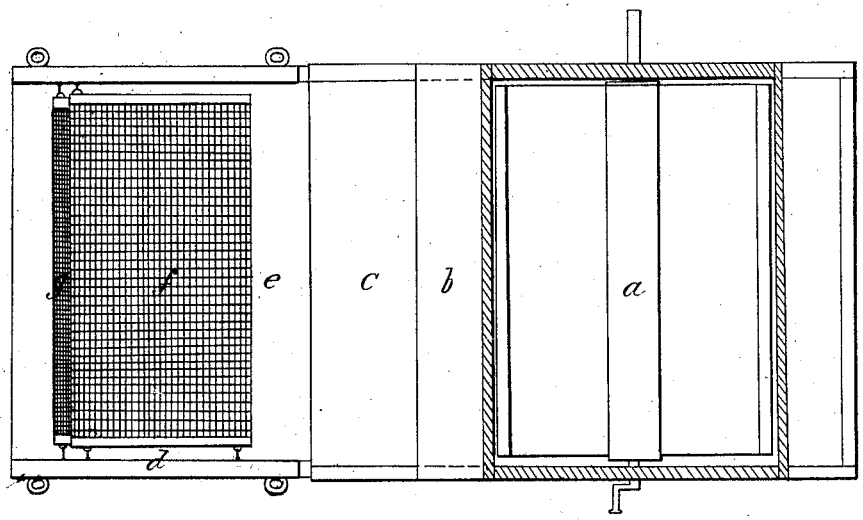
Figure 1:
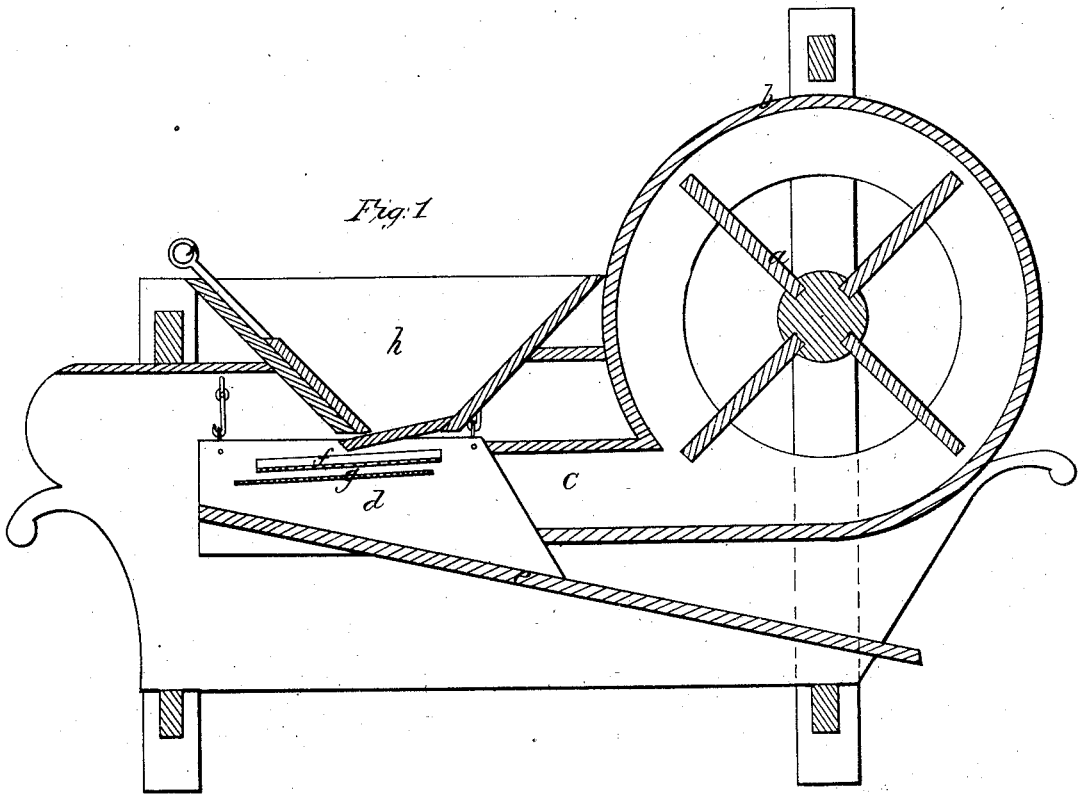
Figure 2:
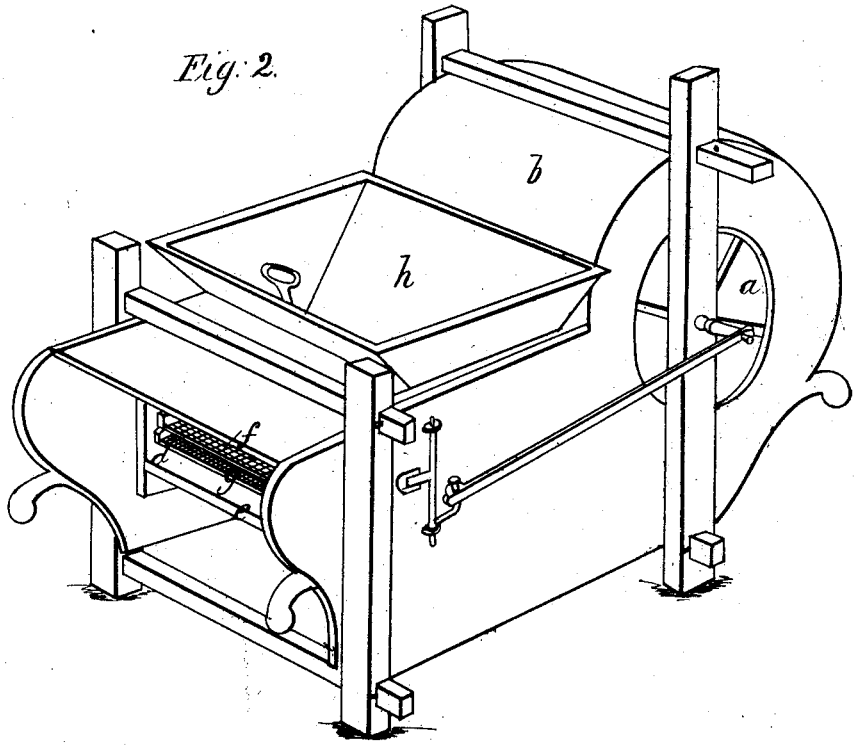
Figure 4:
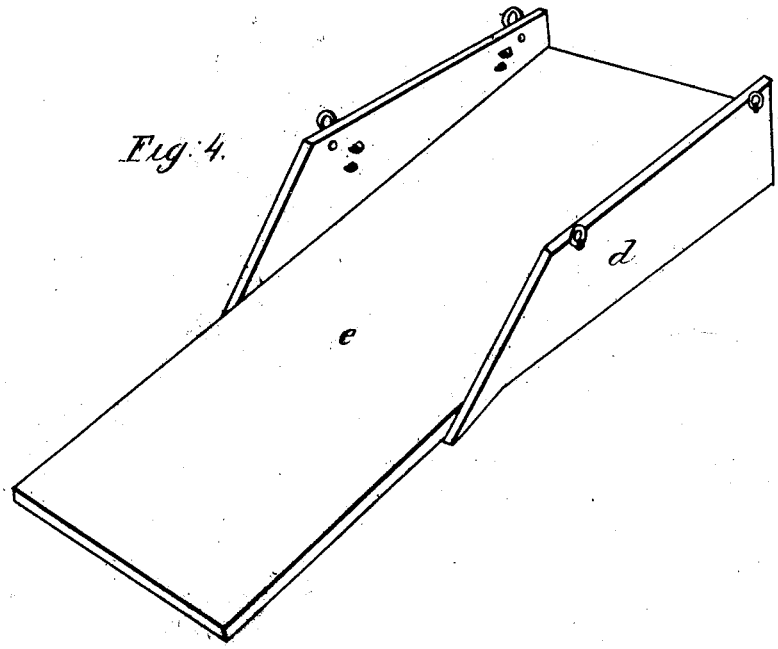

3086X

H. Watkins.

Sheet 1-2 Sheets.

Grain Winnower.

Patented Mar. 18, 1819.

3086X

Sheet 2-2 Sheets.

H. Watkins.

Grain Winnower.

Patented Mar. 18, 1819.

United States Patent Office

PTO - BOYERS, PA Duty Station

MISSING PAGE TEMPORARY NOTICE

PATENT # 3086X FOR ISSUE DATE 3-18-1819

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa